Aug. 19, 1947.   A. J. BOHNENGEL   2,425,724
MEASURING TAPE FEED
Filed Sept. 13, 1944   3 Sheets-Sheet 1

INVENTOR.
Andrew J. Bohnengel
BY
ATT'Y.

Aug. 19, 1947.   A. J. BOHNENGEL   2,425,724
MEASURING TAPE FEED
Filed Sept. 13, 1944   3 Sheets—Sheet 2

INVENTOR.
Andrew J. Bohnengel
BY
ATT'Y

Aug. 19, 1947.　　　A. J. BOHNENGEL　　　2,425,724
MEASURING TAPE FEED
Filed Sept. 13, 1944　　　3 Sheets-Sheet 3
Fig_5
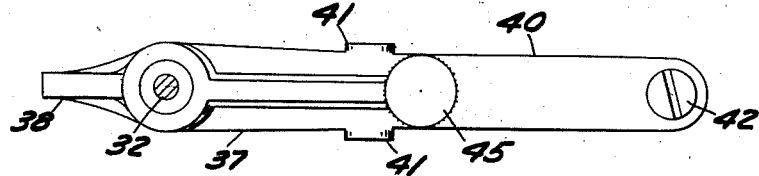
Fig_6
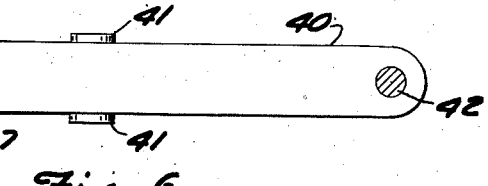
Fig_7
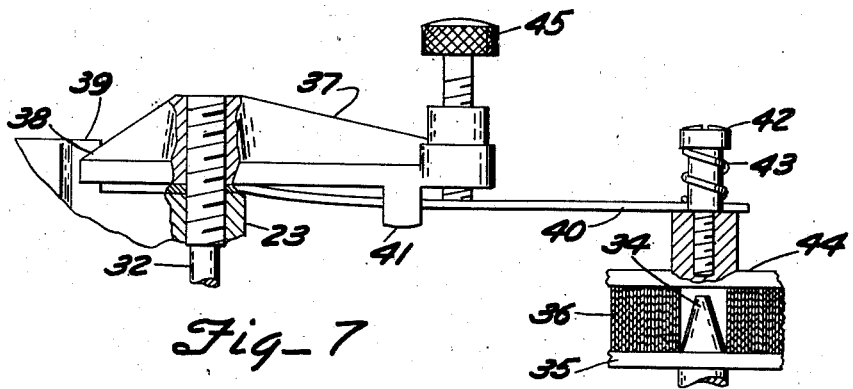
Andrew J. Bohnengel
Inventor.
Attorney.

Patented Aug. 19, 1947

2,425,724

UNITED STATES PATENT OFFICE 2,425,724

MEASURING TAPE FEED

Andrew J. Bohnengel, Toledo, Ohio; August M. Streicher as executor and Harriet Bell Bohnengel as executrix of said Andrew J. Bohnengel, deceased, assignors to Harriet B. Bohnengel Application September 13, 1944, Serial No. 553,933

1 Claim. (Cl. 242—55)

This invention relates to incorporating a measuring strip with a bolt of yard goods. The measuring strip is used to show the part of the material which is left in the bolt.

This measuring material is in the form of a narrow tape which is wound up in the bolt with the other material. During winding, it is traversed across the material for the measuring tape to have a small amount of overlap. Under the invention herein, the end of the tape that is placed in the material to be wound, is drawn by the winding of the bolt to feed the measuring tape into the bolt being wound.

Referring to the drawings:

Fig. 5 is a side elevation of the relatively movable clamp arm for mounting the measuring tape supply roll, upon a larger scale than the showing in Fig. 2;

Fig. 6 is an elevation of the opposite or inner side of the arm of Fig. 5; and

Fig. 7 is a bottom plan view of the arm of Fig. 5, showing parts broken away, and portions connected therewith.

Figure 1:
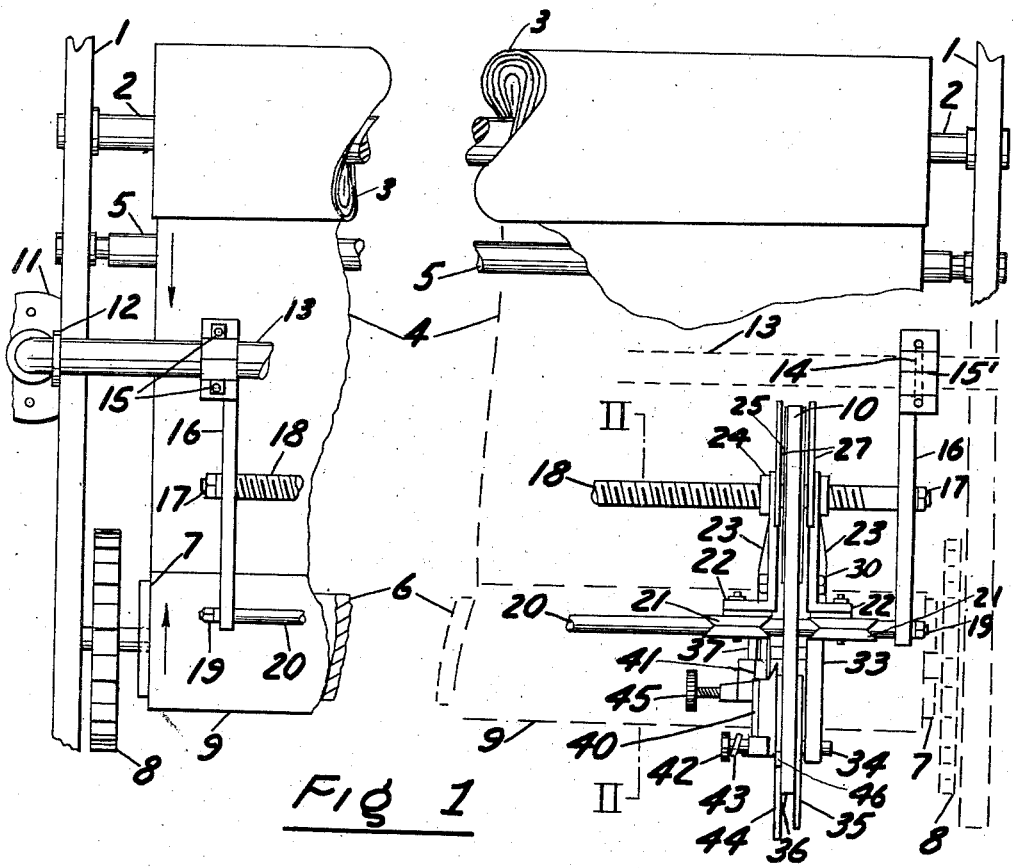
Fig. 1 is a plan view, with parts broken away, of an embodiment of the invention wherein a bolt of yard goods is being wound from a horizontal axis and the measuring tape is being wrapped with the bolt.
Figure 2:
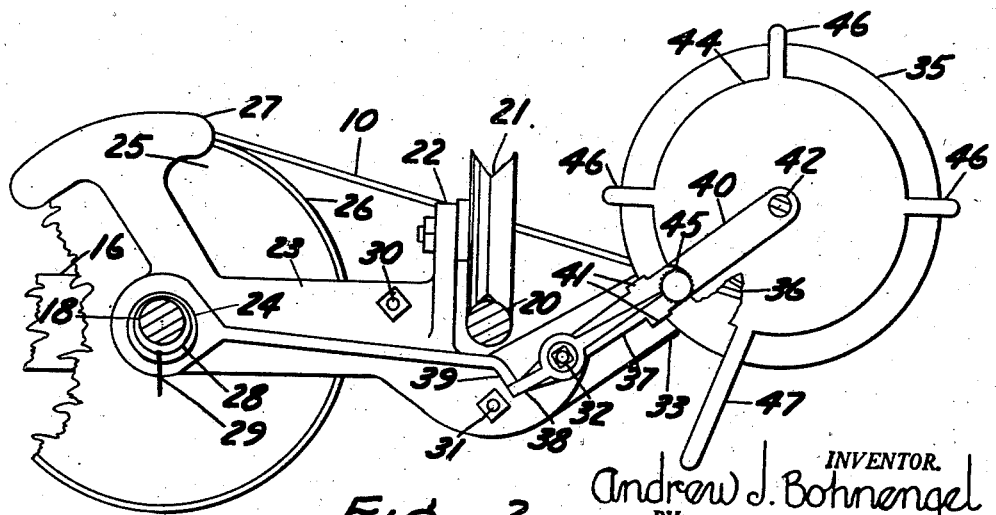
Fig. 2 is a view from the line II—II, Fig. 1, looking toward the right and showing the feeder for the measuring tape in side elevation.

A machine frame 1 (Fig. 1) may be located on a factory floor or the floor of a warehouse. In the frame 1 is a shaft 2. The shaft 2 may have thereon a roll of material 3 to be unwound. The material 3 has extending therefrom a web 4 of the yard goods to be directed over a guide roll 5. Therebeyond, the end of the web 4 may be connected to a flat strip or core piece 6. The strip 6 has end clamps 7. Gears 8 mounted in the frame 1 support the clamps 7 to position the strip 6 parallel to the horizontal roll 3. Upon rotation of the gear 8, the strip 6 turns and winds the web 4 thereon from the bolt 3 to form a length or bolt 9.

When an end of the web 4 is placed on the strip 6, an end of a measuring tape 10 is connected therewith at the right margin. The measuring tape is of the general type of Patent 1,713,070, May 14, 1929, A. J. Bohnengel.

A holder or mounting is provided including a feeder device for the tape. From floor plates 11 rise uprights 12 to a cross frame portion 13, in lieu of having the feeder carried directly upon the machine frame 1. Astride the frame portion 13 are U-bolts 14 having nuts 15 to hold V-seats 15' of a pair of brackets 16. The brackets or arms 16, intermediate their extent away from the frame bar 13, have nuts 17 mounting a feed screw shaft 18. Toward the free ends of the bracket arms 16, nuts 19 mount a track 20.

The track 20 supports a pair of rollers 21 secured in brackets 22. The brackets 22 have horizontal opposing parallel arms 23 extending from the track 20 toward the feed screw 18. In aligned eyes in the free ends of the arms 23 is an internally threaded bushing 24, desirably of 1" internal diameter for 3/4" diameter of the shaft 18. The bushing 24 and the shaft 18 having threading of similar pitch.

Between the arms 23, the bushing 24 is fixed in the hub of a wheel 25. Upon the tread or facing of the wheel 25 is a friction strip, say of rubber 26. Guide cheeks 27 extend upwardly from the arms 23 beyond the rim of the wheel 25 to hold the tape 10 from shifting sidewise clear thereof.

When the wheel 25 rests on the shaft 18, a crescent shaped clearance 28 is provided between the under portion of the shaft 18 and the bushing 24. Fixed on the bracket arms 23 is a light gage strip or wire 29 extending into this clearance. This prevents meshing of the threads of the bushing 24 with the shaft 18 at the underside. The wheel 25 may be lifted to have the threading at the top of the bushing 24 clear of the top of the threading on the shaft 18, and then the carriage, including the arms 23 and the brackets 22, may ride on the rollers 21 along the track 20.

Spacer bolts 30, 31, 32, assemble the arms 23 to hold the wheel 25 in the carriage having the rollers 21.

Integral with an arm 23 and extending in an opposite direction from the shaft 18 is an arm 33. The arm 33 is below the track 20 and at its free end has a bearing for a centering pin 34 for a non-rotary disk 35. The pin 34 protrudes thru the disk 35 and serves as a mounting for a supply roll 36 of the measuring tape. Pivotally mounted on the spacing bolt 32 on the other arm 23 is a lever 37, 38. The end 38 of the lever abuts a stop 39 fixed on the arm 23. The opposite end 37 of the lever extends over a spring leaf 40, having one end connected to the bolt 32. The sides of the lever arm 37 have claws 41 to hold the spring 40 from swinging on the bolt 32 away from the arm 37. Thru the end of the spring 40 is a pin 42. About the pin 42 is a spring 43 yieldably holding a disk 44 engaged by the pin 42. The pin 42 may be swung into alignment with the pin 34 for the disk 44 to clamp the roll 36 against the disk 35. The springs 43, 40, yield sufficiently to engage the centered roll 36, snugly between the disks 35, 44.

At the free end of the lever arm 37 and beyond the claws 41 is a screw 45, which, as adjusted, may press against the spring 40 to bow its medial portion away from the arm 37 and toward the disk 44. The disk 44 is thus adjusted frictionally to hold the roll 36 from free running. Backing off of the screw 45 reduces this drag or holding action upon the roll 36.

The supply roll 36 for the tape may be of larger diameter than the disk 44. The disk 44 has arms 46, 47, to hold the tape from slipping off sidewise. The longer arm 47 may direct the reach of the tape 10 from the roll 36 toward the wheel 25.

An instance of operation may be taken by the operator placing an end of yard goods web 4 on the core piece 6. Before starting the rewinding machine to drive the gears 8, the carriage 23 with the wheel 25 and the roll 36 is located near the right margin (Fig. 1) of the yard goods web 4. A reach of the tape 10 from the wheel 25 is placed on the web 4 at the strip 6. With the ends of the tape and yard material together, at the first wrap, the material holds the tape in taut relation for drawing into the bolt being formed. A width of 25/64" for the tape 10, and 1/4" pitch for the threading on the shaft 18, causes the carriage having the arms 23 and the wheel 25 to move along the track 20 a distance of 16/64" at each rotation of the wheel 25. This distance is less than the full width of the tape 10. The traverse of the tape is crosswise of the width of the yard goods, and the tape overlaps slightly in its succeeding wraps. The traverse feeding is directly controlled by the tape being drawn from the carriage. The tape 10 is drawn from the supply roll 36 and passes about the wheel 25 to cause the wheel 25 to turn. The wheel 25 turns on the feed screw 18 with the bushing 24 in mesh. The reach of the tape 10 from the wheel 25 is thus shifted crosswise of the web 4 from near the right margin toward the left. Upon the desired quantity of yard goods being wound, the machine may be stopped. The material and tape is then severed and the carriage is released to be shifted for a succeeding rewinding operation.

Figure 3:
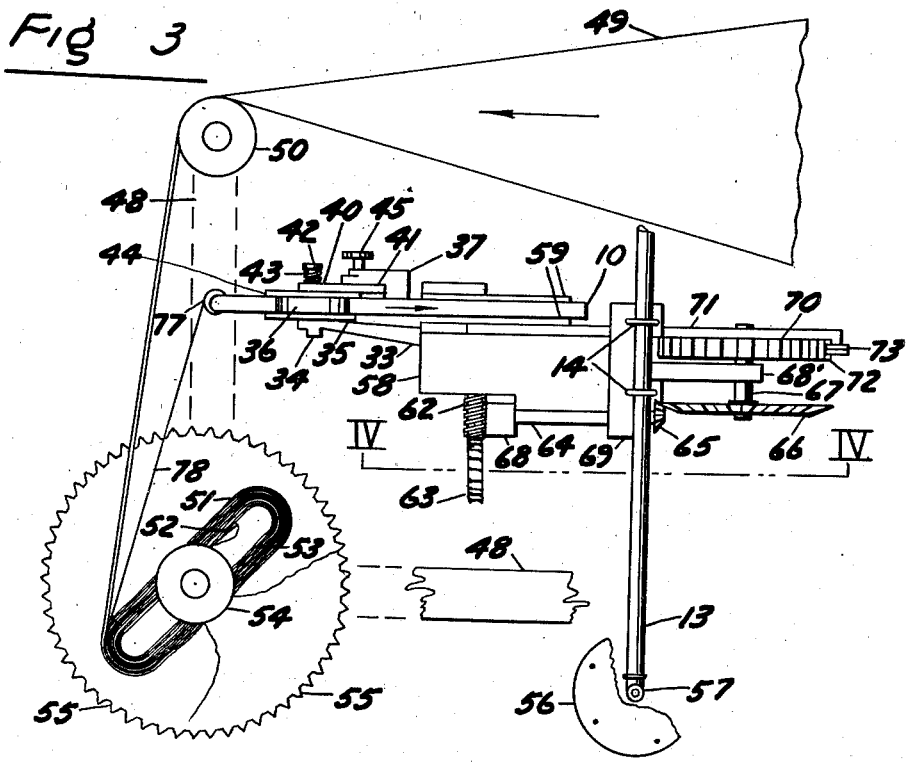
Fig. 3 is a fragmentary view of an installation embodying the invention adapted to feed the tape upon yard goods being wound upon a vertical axis bolt or roll.

A winding machine 48 (Fig. 3) has a yard goods supply web 49. The web passes about a guide roller 50 in the frame 48. A bolt 51 of the rewound material from the web 49 is carried on a core strip 52. End clamps 53 mount the strip 52 to be rotated in the frame 48, as carried by bearings 54. Gear wheels 55 of the machine wind the bolt 51.

The feeder unit may be mounted independently of the machine frame 48. A ceiling plate 56 has an element 57 extending downwardly to a horizontal arm 13. The arm 13 is a support astride which may be placed U-bolts 14 to clamp a feeder device frame member 58 with an arm a portion 33 and opposite thereto a lever 37, together with a strap spring 40. The spring 40 and the arm 33 locate a pair of disks 44, 35, to mount a supply roll 36 therebetween. The disk 44 is yieldably rockable to adapt to the face or side of the roll 36 provided for by the pin 42 and the spring 43. The screw 45 adjusts the amount of braking or retarding of the roll 36 as the tape 10 is drawn therefrom. Even at a non-uniform lineal speed of the strip 52, there is no slack feeding of the tape 10.

The tape 10 passes from the roll 36 between guide cheeks 59 over friction tread 60 of a wheel 61. The tape 10 thus passes in an arc over wheel 61 and turns the wheel. The cheeks 59 rise from the frame 58. The wheel 61 is mounted in the frame 58. The wheel 61 is fixed with a worm 62 in mesh with a worm wheel 63. The worm wheel 63 is on a shaft 64 mounted in bearings 68, 69, upon the frame 58. On the shaft 64 remote from the worm wheel 63 is a pinion 65 in mesh with a bevel gear 66 fixed on a shaft 67 in a bearing arm 68' extending from the frame 58. Fixed on the shaft 67 opposite from the gear 66 is a ratchet 70. A lever 71 is fulcrumed on the shaft 67 and has a pawl 72 normally held by a spring 73 to ride in meshing relation with the ratchet 70.

The longer arm of the lever 71, remote from the pawl 72, has therealong guide rollers 74, 75, 76, 77, located to give a 90° twist to tape being fed upon the bolt 51 between wraps of the web.

Figure 4:
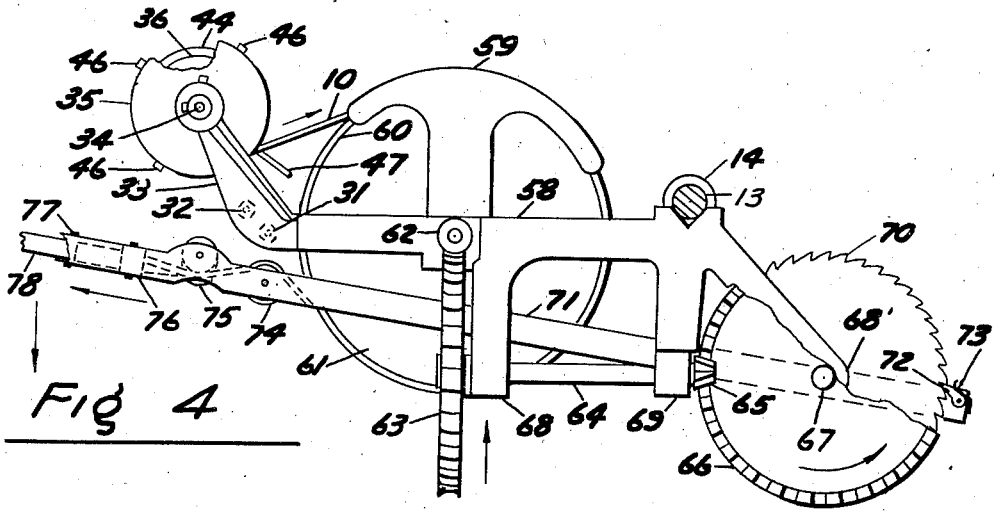
Fig. 4 is a side elevation of the feeder of Fig. 3, portions being broken away, but generally looking upward from the line IV—IV, Fig. 3.

The tape feeder device (Figs. 3, 4) provides for the bolt being rewound to be on a vertical axis. The measuring tape is started near the top edge of the yard goods 49 as its end is placed upon a core strip 52 for winding into a bolt 51. For this starting operation, the lever 71 is tilted to lift the roller 77 just inside the top edge of the web 49. In this lifting, the pawl 72 rides down over the teeth of the ratchet 70. Upon release of the lever 71, the spring 73 throws the pawl 72 into mesh to hold the lever 71 to descend only as the ratchet 70 is rotated. The tape at the reach 78 is drawn from the supply roll 36. The tape 10 from the roll 36 has sufficient wrap about the traction wheel 61 to transmit driving operation therefrom thru the worm and worm wheel speed reduction 62, 63, and the second step speed reduction thru the pinion 65 and the gear 66 to the shaft 67 and the ratchet 70. The worm and worm wheel 62, 63 are one way in transmission operation, so that the pull on the reach 78 does not lower the lever arm 71 as to the roller 77. Traverse of the tape reach 78 across the width of the rewound material forming the bolt 51 provides a slight overlap between succeeding wraps of the tape into the bolt. Upon completion of the yardage desired in the bolt 51, the reach 78 may be severed, and the roller 77 lifted to rock the lever 71 into a starting position for a succeeding bolt rewinding operation.

I claim:

A feeder for a narrow strip of material into a wider web of material being wrapped to form a bolt, said feeder comprising a strip supply holder, a traction wheel for receiving strip from the holder and delivering the strip in the direction of the length of the strip, a traverse effecting mounting for the holder and wheel for sidewise shifting of the strip during its lengthwise delivery, and a speed reduction transmission from the wheel to the mounting actuable from pulling by the web on the strip being delivered to the web between successive wraps thereof, said transmission being connected to move the holder and wheel, in controlling the delivery of the strip, sidewise across the web during the winding of the web into a bolt.

ANDREW J. BOHNENGEL.

REFERENCES CITED

The following references are of record in the file of this patent:

UNITED STATES PATENTS

| Number | Name | Date |
|---|---|---|
| 1,034,575 | Bohnengel | Aug. 6, 1912 |
| 821,839 | Stephan | May 29, 1906 |
| 713,524 | Stephan | Nov. 11, 1902 |

FOREIGN PATENTS

| Number | Country | Date |
|---|---|---|
| 6,364 | Great Britain, 1896 | Apr. 23, 1897 |
| 819,667 | France | July 12, 1937 |